United States Patent [19]

Poincenot

[11] 4,054,082
[45] Oct. 18, 1977

[54] BROACHING MACHINES
[75] Inventor: Rene P. Poincenot, Paris, France
[73] Assignee: Ratier-Forest, Paris, France
[21] Appl. No.: 679,072
[22] Filed: Apr. 21, 1976
[30] Foreign Application Priority Data
  Apr. 30, 1975  Romania .................. 13499
[51] Int. Cl.² .......................... B23D 41/08
[52] U.S. Cl. ............................... 90/96
[58] Field of Search .............. 90/96, 95, 94, 63
[56] References Cited
  U.S. PATENT DOCUMENTS
  1,984,974  12/1934  Lapointe .................. 90/94
  2,420,877  5/1947  Geren ...................... 90/96

FOREIGN PATENT DOCUMENTS
  814,036  5/1959  United Kingdom ........ 90/96

Primary Examiner—Harrison L. Hinson
Attorney, Agent, or Firm—Holman & Stern

[57] ABSTRACT

An improved broaching machine comprises a device for accumulating at least part of the kinetic energy stored during the travel of the tool-carrier slide-block within the assembly constituted by the slide-block, the rotor of the electric motor and the transmission system as well as means for transferring the energy from the slide-block to the accumulation device and conversely.

9 Claims, 4 Drawing Figures

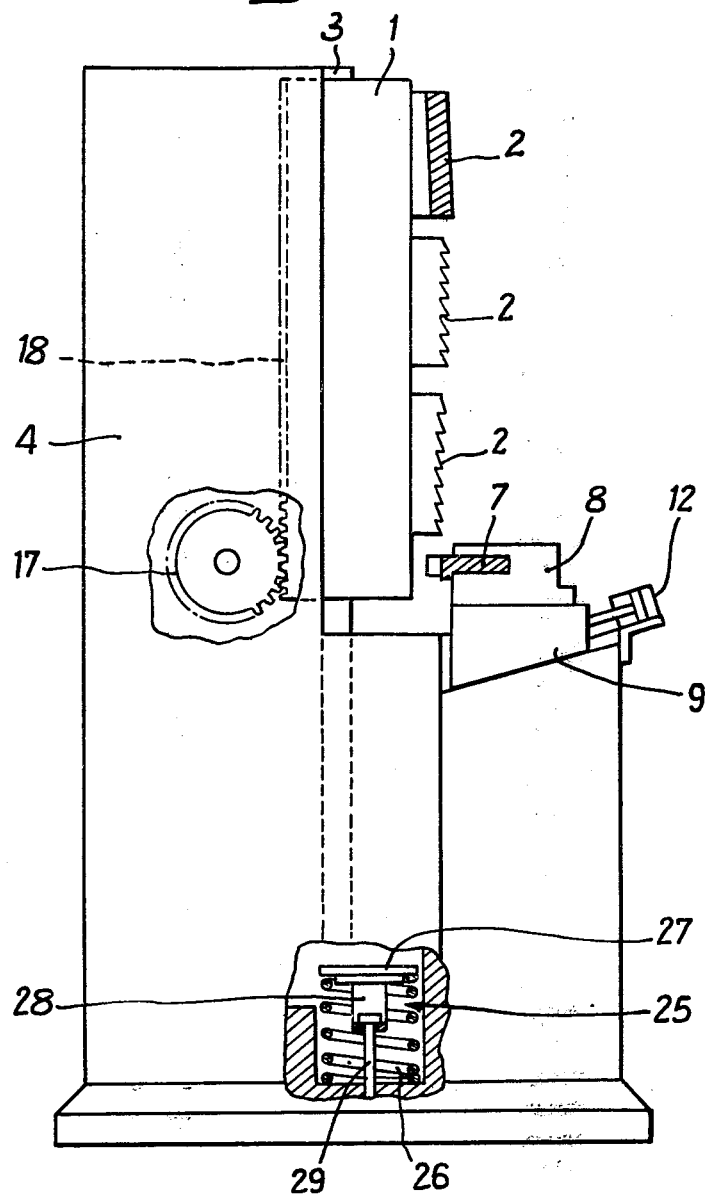

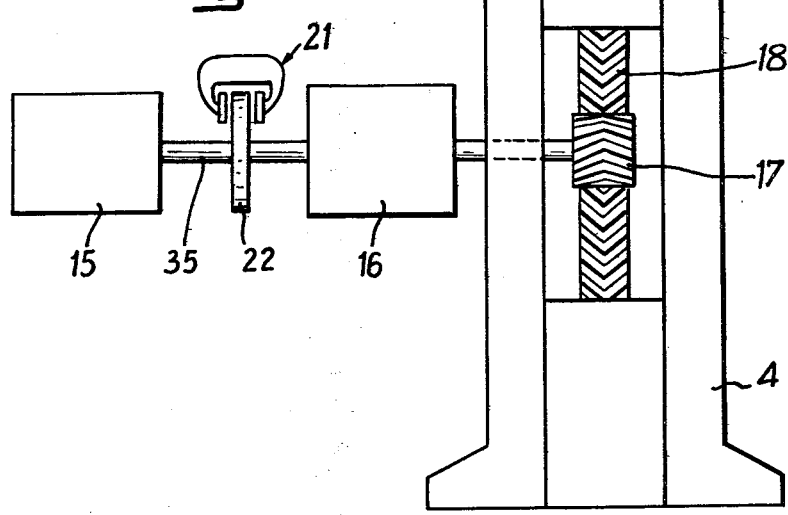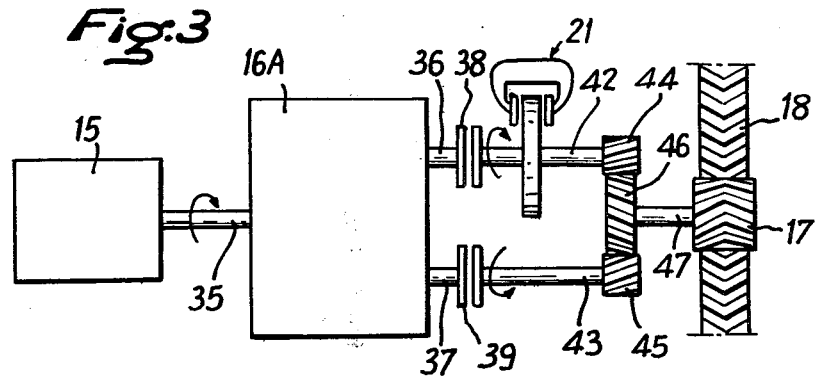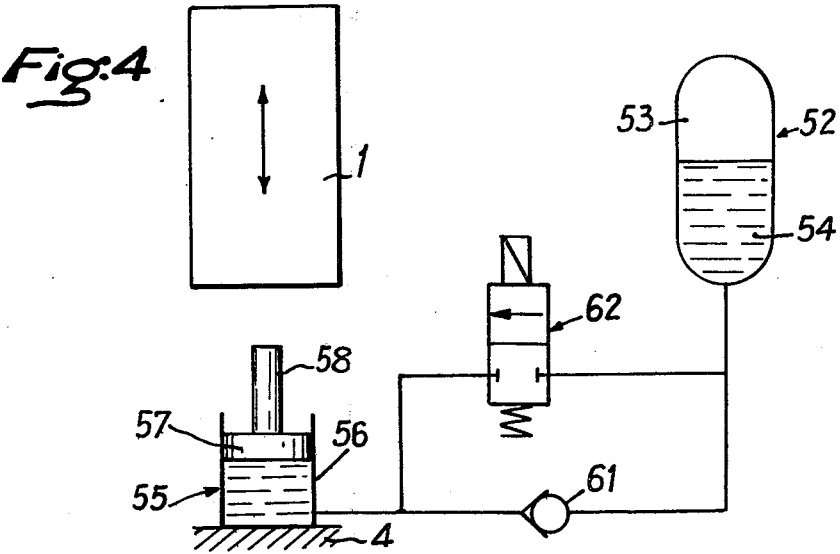

BROACHING MACHINES

FIELD OF THE INVENTION

This invention relates to broaching machines, that is, to machines in which material is removed in chips, the tool or broach being carried by a movable slide-block on a frame to which the workpiece is secured.

BACKGROUND OF THE INVENTION

These machines make use of a technique which is undergoing constant change. Especially in the automobile industry, this machining technique is being more and more widely adopted in factories for the large-scale production of parts. Its main advantages lie in highly accurate performance, good finish or in other words a good state of surface, and a high production rate. Although broaches are specially designed for each workpiece and their cost is therefore very high, the process of machining by broaching proves to be highly economical when applied to large-scale production.

Broaches and machining jigs are constantly becoming more modern, more complex and more accurate. Broaching machines follow this evolution only with difficulty. Tests have shown that the state of surface of machined parts varies with the cutting speed; above approximately 25 m/min, it has been found that the state of surface is as good as at low speed, especially in the case of a substantial depth of pass. In point of fact, broaching machines of the type in use at the present time are designed to operate at cutting speeds which hardly exceed 20 m/min, that is, within an unsatisfactory speed range.

In these machines the motion of the tool-carrier slide-block is often controlled by a hydraulic jack. This solution is well suited to low slide-block speeds but in the vicinity of 25 m/min and above this rate, the problems of rigidity of the spindle, of output of the hydraulic power unit, of pressure drops, overheating of oil, pressure surges and so forth become practically insoluble in the present state of the technique.

An attempt has also been made to drive broaching machines by means of an electric d.c. motor but this solution is also attended by drawbacks. By reason of the fact that the motor produces accelerations, slowing-down, stopping and reversing of the direction of the slide-block, said motor must be controlled by a speed-changing device which is both powerful and reliable and therefore relatively costly. The weight of the moving system constituted by the slide-block, the broach, the rotor of the motor and the elements of the transmission system placed between the rotor and the slide-block is substantial, especially in machines of large size. In consequence, the positive or negative accelerations which have to be imparted to the slide-block result in substantial current surges and overheating of the motor which have an adverse effect on its length of life.

These disadvantages become of greater importance as the cutting speeds to be attained become higher and increase the variations in kinetic energy of the moving system. Moreover, whereas it is only necessary in the case of horizontal machines to take into account the accelerations of the moving system, it also proves necessary in vertical machines to overcome the acceleration of gravity at the time of upward motion of the slide-block.

SUMMARY OF THE INVENTION

The aim of the present invention is to improve broaching machines with a view to reducing the above-mentioned disadvantages of known machines.

To this end and in accordance with the invention, the machine comprises a device for accumulating at least part of the kinetic energy stored during the travel of the slide-block within the assembly constituted by said slide-block, the rotor of the electric motor and the transmission system aforementioned as well as means for transferring said energy from the slide-block to the accumulation device and conversely.

By virtue of this combination of means, at least in regard to the working stroke, the electric motor no longer has to carry out the slowing-down of the entire moving system in the last portion of its travel since the kinetic energy which had been stored therein is transferred into the accumulation device. In addition, considerable assistance is given to the motor in imparting the return travel to the slide-block since the beginning of said travel is initiated by the energy which is restituted by the accumulation device.

This improvement in the operation of the machine makes it possible to employ for driving the slide-block an asynchronous motor which is connected directly to the power supply network. Slowing-down and acceleration are thus carried out by means of the energy delivered by the accumulation device without supplying current to the motor, thus eliminating the high current surges which usually occur at the time of start-up and reversal of direction. The motor operates at its normal regime without having to exceed its rated power even temporarily, thus removing problems related to overheating of the motor. Moreover, the ratio of torque to inertia of the rotor of the motor is more favorable in the case of an asynchronous motor than in the case of a direct-current motor. Thus, at equal power, its kinetic energy is lower, thereby facilitating the conditions of operation of said motor.

A more complete understanding of the invention will be gained from the following description and from the accompanying drawings in which a few embodiments of an improved machine in accordance with the invention are shown by way of example, and in which:

DESCRIPTION OF THE FIGURES OF THE DRAWING;

FIG. 1 is a general schematic profile view of a first embodiment of a vertical broaching machine in accordance with the invention;

FIG. 2 is a corresponding schematic rear view to a smaller scale;

FIG. 3 shows an alternative form of FIG. 2;

FIG. 4 is a schematic view showing another embodiment of an energy-accumulation device associated with a machine of the type shown in FIG. 1.

DESCRIPTION OF PREFERRED EMBODIMENTS

The vertical broaching machine which is illustrated schematically in FIG. 1 comprises a slide-block 1 which carries tools or broaches 2 and is capable of displacement in reciprocating motion within vertical guides 3 which are rigidly fixed to a frame 4. The part 7 to be machined is clamped in a machining jig 8 and this latter is fixed on a retractable table 9, the movements of which are carried out, for example, by means of a pressurized-fluid jack 12.

The movements of the slide-block are carried out by means of an asynchronous electric motor 15 (as shown in FIG. 2) through a transmission system comprising a reduction-gear unit 16 and a pinion 17 disposed in meshing engagement with a toothed rack 18 which is rigidly fixed to the slide-block 1. The teeth of the pinion and of the rack are preferably of the herringbone type in order to prevent any lateral component on the slide-block.

The transmission system is fitted with a brake of the disc type, for example, as shown diagrammatically at 21 in which the disc 22 is rigidly fixed to the shaft 35 of the asynchronous motor 15.

The kinetic energy stored in the slide-block, the rotor of the motor and the transmission system which provides a coupling between these latter is absorbed at the end of the working stroke by an energy accumulation device 25 which, in the embodiment of FIG. 1, is constituted by a helical compression spring 26 having a vertical axis, the lower extremity of which rests on the base of the frame 4 and the upper extremity of which is located on the end of the path of the lower extremity of the slide-block 1. In the example which is illustrated, the spring 26 is prestressed. To this end, a plate 27 which rests on said spring supports a stirrup-piece 28 through which a vertical rod 29 passes freely. The lower extremity of the rod is anchored in the base of the frame and the upper extremity of said rod has a head which limits the elongation of the spring 26 to the value corresponding to the desired pre-tension.

The operation of the machine is as follows:

Assuming that the slide-block is in the top position shown in FIG. 1 and that a part 7 to be machined is in position in the machining jig 8 which is fixed on the table 9, the disc brake 21 is slackened-off (as shown in FIG. 2), with the result that the acceleration of gravity can be freely exerted on the slide-block and can consequently initiate the downward movement of this latter. When the slide-block has attained an appreciable speed, the electric motor 15 is supplied so as to cause this latter to rotate in the corresponding direction, thus maintaining the downward travel of the slide-block which is slowed-down by the engagement of the broaches 2 in the part 7 to be machined. When the slide-block is about to reach the end of its downward travel, the supply current to the electric motor is cut-off, the lower extremity of the slide-block 1 comes into contact with the top plate 27 of the energy accumulation device 25 and consequently compresses the spring 26 until the entire kinetic energy stored in the moving system constituted by the electric motor 15, the slide-block 1 and the transmission system which provides a coupling between these latter has passed into the spring 26. At the moment of stopping of the slide-block, the brake 21 is applied. At the same time, the workpiece supporting table 9 is subjected to the action of the retracting jack 12 in order to ensure that the machined part 7 does not rub against the broaches 2. The energy accumulated within said spring then passes back into the slide-block 1 and begins its upward movement. The electric motor 15 is again supplied so as to cause rotation in the opposite direction in order to bring the slide-block 1 to the upper extremity of its upward return stroke. During this upward return stroke, the machined part is ejected and a fresh part is fixed in the machining jig 8. The supply to the motor is cut-off shortly before the slide-block reaches the end of its travel, slowing-down of which is ensured by the acceleration of gravity. At the moment when the slide-block stops, the brake 21 is applied. At the same time, the workpiece supporting table is subjected to the action of the retracting jack 12 in order to ensure that the part 7 to be machined is in the machining position. The cycle is then completed.

By reason of the fact that slowing-down and acceleration of the slide-block are carried out at the bottom portion of its travel by the energy accumulation device 25 and at the top portion of its travel by gravity and that the electric motor is not supplied during the corresponding periods, said motor is not subjected to any abnormal fatigue and operates only at its rated power with relatively small variations in speed.

The disc brake 21 is particularly well suited to the function which it is intended to perform by virtue of its simplicity, its ruggedness, its high resistance to heating and its low inertia. In a normal cycle, the brake locks the transmission system as soon as the slide-block attains zero velocity at the end of travel. In the event of an emergency trip, said brake is capable of stopping the slide-block in any position.

The variant shown in FIG. 3 differs from the embodiment shown in FIG. 2 in the fact that the reduction-gear unit 16A has an input shaft 35 for coupling this latter to the asynchronous electric motor 15 which always rotates in the same direction and two output shafts 36, 37 which rotate in opposite directions and are coupled to two shafts 42, 43 by means of two clutch units 38, 39. On said shafts 42, 43 are fixed two pinions 44, 45 which are simultaneously in mesh with a common gear-wheel 46 and this latter is fixed on the shaft 47 which carries the pinion 17, said pinion being disposed in meshing engagement with the toothed rack 18 which is rigidly fixed to the slide-block. The disc brake 21 cooperates, for example, with the shaft 42.

Depending on whether it is desired to displace the sliding-block upwards or downwards, either of the two clutch units 38 or 39 is accordingly engaged. This engagement is carried out after initiating the displacement of the slide-block, either under the action of the energy accumulation device 25 or under the effect of acceleration of gravity, with the result that the engagement of said clutch units can take place at a moment when the relative velocity of their driving and driven members is practically zero, with the result that the wear of the clutch linings is insignificant.

There is shown in FIG. 4 an alternative embodiment of the energy accumulation spring device shown in FIG. 1. This device is constituted by a hydro-pneumatic accumulator 52 which is preferably oleo-pneumatic with an upper chamber 53 filled with a gas phase and a lower chamber 54 filled with a liquid phase, namely oil in this instance. Said bottom chamber is connected to an energy-transfer jack 55, the cylinder 56 of which is supported by the frame 4 of the machine whilst the jack piston 57 is integral with a push-rod 58 located at the end of the downward stroke of the lower extremity of the slide-block 1. The circuit which provides a connection between the oleo-pneumatic accumulator 52 and the jack 55 comprises a non-return valve 61 by-passed by a valve preferably consisting of an electro-valve 62 for controlling the flow of liquid from the accumulator towards the jack.

The operation of this accumulation device is as follows:

During the last portion of its downward travel, the slide-block 1 thrusts back the piston 57 of the jack 55, transfers part of the oil contained in said jack through the non-return valve 61 and discharges said oil into the accumulator 52, thus increasing the pressure within this latter; the electro-valve 62 is closed during this period as shown in FIG. 4. In order to control the return movement of the slide-block, the electro-valve 62 is placed in the open position under the control of an electrical system of any suitable and conventional type (not illustrated). In consequence, part of the liquid under high pressure which is contained in the accumulator 52 passes through said electro-valve, penetrates into the jack 55 and lifts the jack piston 57 which transmits to the slide-block 1 the energy which it thus receives from the accumulator. The operation is the same as in the embodiments described earlier in regard to the asynchronous electric motor.

The examples described and illustrated relate to a vertical broaching machine but the principle of the invention is also applicable to horizontal broaching machines and advantageously in this case to each of the two extremities of travel of the slide-block.

It would also be possible to apply the principle of the invention to the end of the return travel of the slide-block in a vertical broaching machine if it were desired to utilize higher accelerations than those of gravity.

It is readily apparent that the invention is not limited to the embodiments described with reference to the accompanying drawings and that, depending on the applications which are contemplated, modifications can accordingly be made without thereby departing either from the scope or the spirit of the invention.

I claim:
1. A broaching machine comprising:
a frame provided with guideways,
a workpiece-carrying support carried by said frame,
a slide-block reciprocable in said guideways to achieve a cutting stroke and a return stroke and adapted to carry a broaching tool to operate upon a workpiece supported on said workpiece-carrying support, during said cutting stroke,
an asynchronous electric motor having a stator and a rotor,
a transmission system operatively connecting said rotor and said reciprocable slide-block,
energy accumulating means for accumulating at least part of the kinetic energy stored in said slide-block, in said rotor and in said transmission system, during at least one of said cutting and return strokes,
and energy transfer means for transferring said energy from said slide-block to said energy accumulating means and from said energy accumulating means to said slide-block.

2. A broaching machine as claimed in claim 1, wherein said energy accumulating means is constituted by a resiliently deformable element secured to said frame, a portion of said resiliently deformable element being located near the end of the corresponding said stroke of said slide-block to serve as said energy transfer means.

3. A broaching machine comprising:
a frame provided with guideways,
a workpiece-carrying support carried by said frame,
a slide-block reciprocable in said guideways to achieve a cutting stroke and a return stroke and adapted to carry a broaching tool to operate upon a workpiece supported on said workpiece-carrying support, during said cutting stroke,
an asynchronous electric motor having a stator and a rotor,
a transmission system operatively connecting said rotor to said reciprocable slide-block,
energy-accumulating spring means secured to said frame for accumulating at least part of the kinetic energy stored in said slide-block, in said rotor and in said transmission system, during at least one of said cutting and return strokes, a portion of said energy accumulating spring means being located near the end of the corresponding said stroke of said slide-block for serving as energy transfer means for transferring said energy from said slide-block to said energy accumulating spring means and from said energy-accumulating spring means to said slide-block.

4. A broaching machine comprising:
a frame provided with guideways,
a workpiece-carrying support carried by said frame,
a slide-block reciprocable in said guideways to achieve a cutting and a return stroke and adapted to carry a broaching tool to operate upon a workpiece supported on said workpiece-carrying support, during said cutting stroke,
an asynchronous electric motor having a stator and a rotoe,
a transmission system operatively connecting said rotor to said reciprocable slide-block,
a resiliently deformable energy-accumulating element secured to said frame for accumulating at least part of the kinetic energy stored in said slide-block, in said rotor and in said transmission system, during at least one of said cutting and return strokes, a portion of said resiliently deformable energy-accumulating element being located near the end of the corresponding said stroke of said slide-block to serve as energy transfer means for transferring said energy from said slide-block to said resiliently deformable energy-accumulating element and from said resiliently deformable energy-accumulating element,
and means pre-tensioning said resiliently deformable element.

5. A broaching machine as claimed in claim 3, further comprising pretension means constituted by a stop for limiting the movement of said energy-accumulating spring means towards a free state position.

6. A broaching machine as claimed in claim 1, wherein said energy-accumulating means comprise a hydropneumatic accumulator and said energy transfer means comprise an energy transfer jack having a movable member, said energy transfer jack being secured to said machine frame, said movable member of said energy transfer jack being located near the end of the corresponding said stroke of said slide-block.

7. A broaching machine comprising:
a frame provided with guideways,
a workpiece-carrying support carried by said frame,
a slide-block reciprocable in said guideways to achieve a cutting stroke and a return stroke and adapted to carry a broaching tool to operate upon a workpiece supported on said workpiece-carrying support, during said cutting stroke,
an asynchronous electric motor having a stator and a rotor,
a transmission system operatively connecting said rotor to said reciprocable slide-block, a hydro-pneumatic accumulator containing liquid and gas under pressure for accumulating at least part of the kinetic energy stored in said slide-block, in said rotor and in said transmission system, during at least one of said cutting and return strokes, an energy transfer jack coupled to said hydro-pneumatic accumulator for transferring said energy from said slide-block to said hydro-pneumatic accumulator and from said hydro-pneumatic accumulator to said slide-block; said energy transfer jack being secured to said machine frame and having a movable member, said movable member of said energy transfer jack being located near the end of the corresponding said stroke of said slide-block, a non-return valve between said hydro-pneumatic accumulator and said energy transfer jack, and a control valve by-passing said non-return valve for controlling the flow of said liquid from said accumulator to said jack.

8. A broaching machine as claimed in claim 1, further comprising a brake system associated to said transmission system.

9. A broaching machine comprising:

a frame provided with guideways, a workpiece-carrying support carried by said frame, a slide-block reciprocable in said guideways to achieve a cutting stroke and a return stroke and adapted to carry a broaching tool to operate upon a workpiece supported on said workpiece-carrying support, during said cutting stroke, an asynchronous electric motor having a stator and a rotor, a transmission system operatively connecting said rotor to said reciprocable slide-block, said transmission system comprising two shafts rotating in opposite directions and two clutch units respectively associated with said two shafts, energy accumulating means for accumulating at least part of the kinetic energy stored in said slide-block, in said rotor and in said transmission system, during at least one of said cutting and return strokes, and energy transfer means for transferring said energy from said slide-block to said energy accumulating means and from said energy accumulating means to said slide-block.

* * * * *